March 25, 1969  H. LEIBACH ET AL  3,434,289
FUEL SUPPLY FOR AFTERBURNER
Filed Jan. 27, 1967

INVENTORS
Heinrich Leibach
Ralph Vedova

BY Bailey, Stephens and Huettig
ATTORNEYS

United States Patent Office

3,434,289
Patented Mar. 25, 1969

3,434,289
FUEL SUPPLY FOR AFTERBURNER
Heinrich Leibach, Puchheim, and Ralph Vedova, Munich, Germany, assignors to M.A.N. Turbo GmbH, Munich-Allach, Germany
Filed Jan. 27, 1967, Ser. No. 612,142
Claims priority, application Germany, Jan. 28, 1966, M 68,170
Int. Cl. F02k 1/24, 1/06
U.S. Cl. 60—232                                                                      2 Claims

ABSTRACT OF THE DISCLOSURE

The fuel nozzle manifolds in an afterburner are segmented for injecting fuel in a non-uniform pattern to produce a uniform temperature distribution of the burning gases over the cross-section of the exhaust pipe.

---

This invention relates to combustion means for turbojet engines, especially for the provision of afterburning of fuel in a jet engine exhaust gas pipe, and in particular, in a pipe which is built as a rigid, elbow-type component or which comprises individual cylindrical pipe sections which may be rotated relative to one another or slid one over the other, in order to divert the reheated engine gases from the horizontal into any other desired direction, preferably for producing a vertical thrust component.

It is known that, with straight exhaust pipes in which afterburning takes place, there is a hot core in the flow pattern in spite of uniform fuel distribution over the whole cross-section of the pipe. Tests have shown that, in an elbow-type pipe, the hot core is shifted towards that side of the pipe featuring the smaller radius of curvature. Thus, those areas on the wall of the pipe located within the zone of the inner curvature are subjected to particularly high temperatures, which, without special countermeasures, would lead to premature destruction of the pipe and its heat shield, respectively.

The combustion device according to this invention eliminates the above disadvantages by separating several, preferably, circular-shaped fuel injection manifolds, arranged concentric and spaced with regard to one another, into individual injector manifold segments, the fuel supply of which may be reduced or cut off, if required, in order to achieve a uniform temperature pattern over the walls of the jet pipe and its heat shields or flame tubes, respectively.

In a further embodiment of the invention, more injector manifold segments are added to those sections of the main injector manifolds which are located adjacent to the outer curvature bend of a thrust diverter. These segments may be supplied with fuel independent of one another as well as independent of the main injector manifolds, thus enabling the fuel supply to the main injector manifolds to be reduced during the thrust diversion phase, while the fuel supply to the additional fuel injector manifold segments is being maintained, whereas in the straight, nondiverted condition of the thrust diverter, the additional fuel injector manifold segments are shut off and the fuel is supplied to the main injector manifolds.

From the German Auslegeschrift 1,133,185 (German patent laid open for opposition), an afterburning device is known which, among other features, is characterized by the use of circular injector manifolds which can be supplied with fuel indepedent of one another. Furthermore, this device is provided with injector manifolds which, for the purpose of delivering two different fuel quantities, are of the dual type and arranged in such a manner as to permit counterflow injection of one or the other injector. This afterburning device serves especially the purpose of maintaining combustion stability and efficiency even at high altitudes. Thus, the effect is not identical with that of the combustion device according to this invention, which effects a nonuniform fuel distribution and affects the temperature distribtuion within the flow pattern in such a manner as to create "lean" zones by reducing or shutting off the fuel supply to individual injector manifold segments, whereby the temperature of areas in the vicinity of the walls of a jet pipe equipped with a combustion device according to this invention can be considerably reduced. Thus, the general concept of this invention comprises a combustion device in the jet exhaust pipe of a turbojet engine characterized by the fact that a uniform temperature pattern is ensured by producing a nonuniform fuel injection pattern.

A particular advantage is gained if the combustion device according to this invention is applied to an elbow-type jet exhaust pipe receiving the engine exhaust gases or to an appropriate thrust diverting device, which is positioned in such a manner as to divert the reheated engine exhaust gases from a horizontal into a vertical direction in order to produce a vertical thrust component.

If the combustion device according to this invention is applied to the latter case, the fuel supply to the main injector manifolds will be considerably reduced, and fuel is supplied to the additional injector segments, which will be operative and effect a central positioning of the hot combustion core in such a manner as to subject the zones of the jet diverting device, located adjacent to the wall, or its inner components, respectively, to relatively low temperatures.

In order to achieve a uniform temperature pattern and thus a corresponding favorable position of the hot combustion core in the thrust diverting device throughout the swivelling range, this invention provides for a control system operating as a function of the diverting angle of the thrust diverter. This control system enables the fuel supply to the individual injector manifold segments or, for instance, to the main injector manifolds to be considerably reduced or even shut off in proportion to the increasing diverting angle of the thrust diverter. Also, the fuel supply to other fuel injector manifolds, for instance, the additional injector manifold segments, can be increased accordingly.

Furthermore, it is proposed in the invention to design the injection pipes as straight tubes and to arrange them basically as radiants emanating from the center of the jet exhaust pipe and directed outwardly towards its walls, the fuel supply to be selected either for individual tubes or for groups of tubes independent of one another, whereby at least some of these injection tubes carry stub tubes featuring nozzle openings.

This embodiment of a combustion device is also suited for achieving a uniform temperature pattern in the combustion region and on the walls of a jet pipe or a thrust diverter, respectively.

The means by which the objects of this invention are obtained are described more fully with reference to the accompanying drawings, in which.

Figure 1:
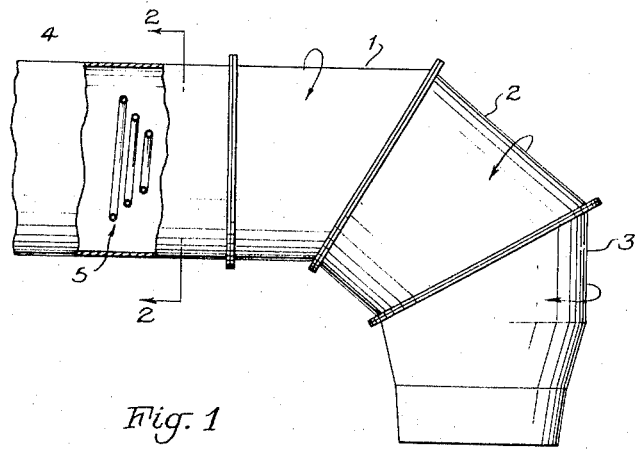
FIGURE 1 is a schematic front view, partially broken away, of a jet exhaust pipe with an afterburner and changeable from a straight to an elbow shape.

FIGURE 1 shows a thrust diverting device, arranged downstream of a turbojet engine not shown herein, and consisting basically of three exhaust pipe sections 1, 2 and 3 which may be rotated relative to one another, the direction of rotation being indicated by arrows. The purpose of this diverter is to divert the engine gases which are, at first, heated by a combustion device 5 mounted in a rigid jet exhaust pipe section 4, from the horizontal direction into a, preferably, vertical direction according to FIGURE 1, in order to produce a vertical thrust component.

The thrust diverting device may also have another shape, i.e., it may be a rigid, elbow-type jet pipe, or may be made up of individual cylindrical pipe sections, which can be rotated relative to one another, or of pipe sections which can be slid one over the other, in order to divert the reheated engine gases from the horizontal to any other desired direction, preferably for producing a vertical thrust component.

Figure 2:
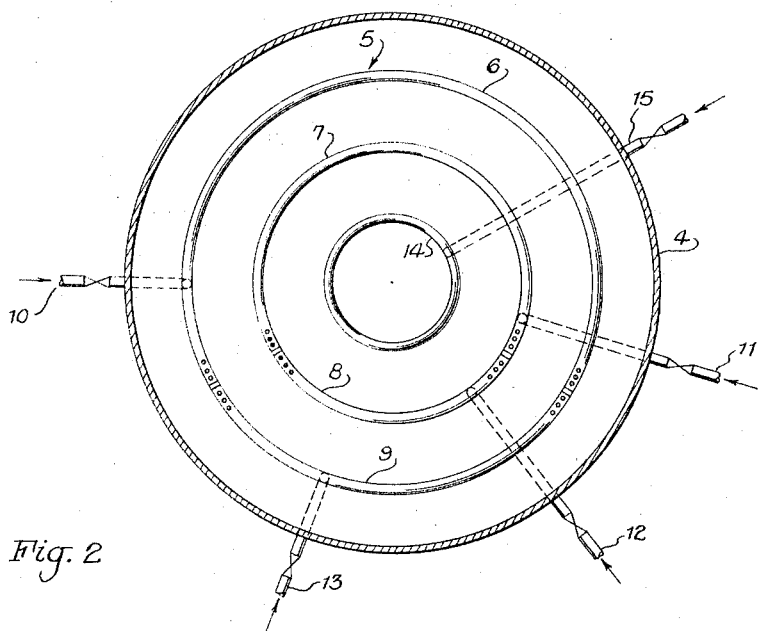
FIGURE 2 is an enlarged cross-sectional view taken on the line 2—2 of FIGURE 1.

FIGURE 2 shows details of a combustion device 5 which, in this case, effects afterburning of the engine gases and which, by virtue of its design, accomplishes the basic purposes of this invention. The combustion device 5 consists of several annular injection manifolds arranged with space between them and concentric to the centerline of jet exhaust pipe 4. According to this invention, these injection manifolds are separated into individual segments 6, 7, 8 and 9, each of them having a separate fuel supply line 10, 11, 12 and 13, respectively. Due to its small diameter, the innermost annular injection manifold 14 is not separated into segments and has only one fuel supply line 15. As required by the operating conditions, regions with lean or rich fuel supply can be produced by shutting off or throttling down the individual fuel supply lines and, simultaneously, increasing the fuel supply to other injector manifolds, so that a uniform temperature pattern in the rigid jet pipe 4 and in pipe sections 1, 2 and 3 is achieved.

Figure 3:
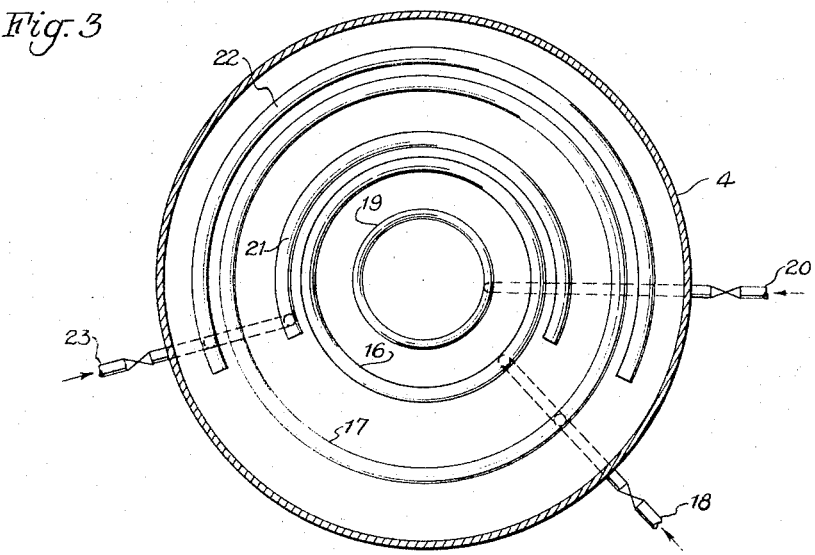
FIGURES 3, 4 and 5 are views similar to FIGURE 2 of different modifications of the invention, respectively.

A further embodiment of a combustion device, as shown in FIGURE 3, comprises two annular main injector manifolds 16, 17 with a common fuel supply line 18 and an innermost annular main injector manifold 19, the fuel supply 20 of which is separated from that of the remaining injector manifolds. Additional injector manifold segments 21, 22 are arranged around the main injector manifolds 16, 17 and overlap the upper half of the latter in a circumferential direction, also having a common fuel supply line 23. If the thrust diverter is in the diverted position according to FIGURE 1, the additional injector manifold segments 21, 22 are supplied with fuel, while the fuel supply to the main injector manifolds 16, 17 and 19 is throttled back. The fuel flow to the various injection means 16, 17, 19, 21 and 22 can be varied as a function of the swivelling angle of the thrust diverting device and the change in position of the hot combustion core necessitated thereby and as a function of the thrust requirements. The additional injector manifold segments 21, 22 may also be separated into several individual segments with separate fuel supply.

Figure 4:
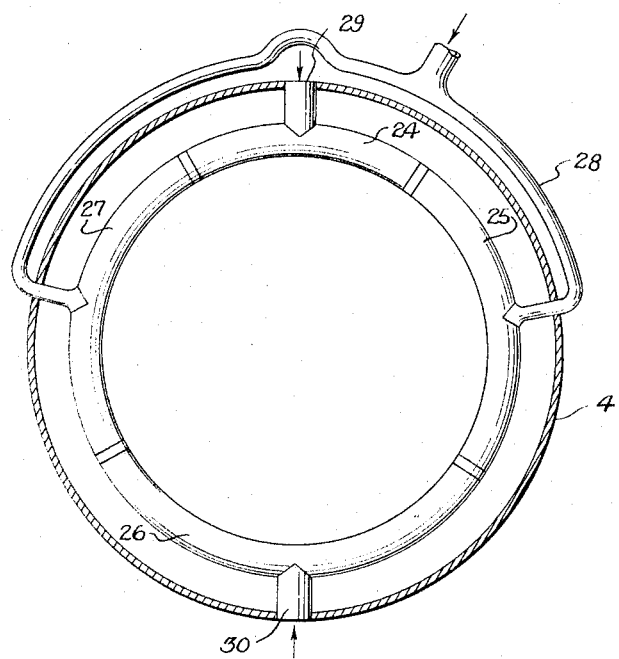

FIGURE 4 shows a combustion device comprising manifold segments 24, 25, 26, 27. Segments 25, 27 are fed by a common fuel supply line 28; segments 24, 26 feature different fuel supply lines 29, 30.

The pressures in the supply lines to segments 24, 25, 26, 27 can be set as a function of the swivelling angle of the thrust diverter.

Figure 5:
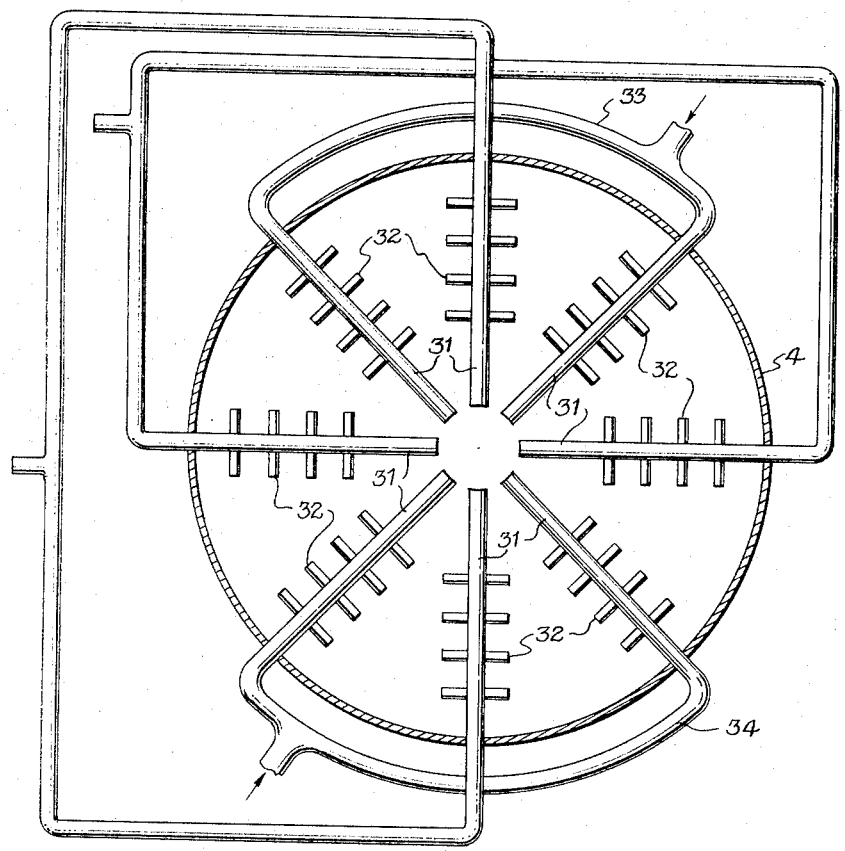

In the embodiment shown in FIGURE 5, the injector manifolds are designed as straight jet tubes 31, arranged as radiants emanating from the center of exhaust pipe 4 and directed towards its wall. Each tube 31 features stub tubes 32 of equal shape and size which are provided with additional nozzle openings. Two each of the tubes 31 are fed with fuel by common supply lines 33, 34. The remaining tubes 31 are fed with fuel from a common supply line. Finally, in an arrangement of tubes 31 in a further embodiment of a combustion device not presented herein, it will be possible to select fuel supply to tubes 31 either individually or to groups of tubes independent of one another.

Figure 6:
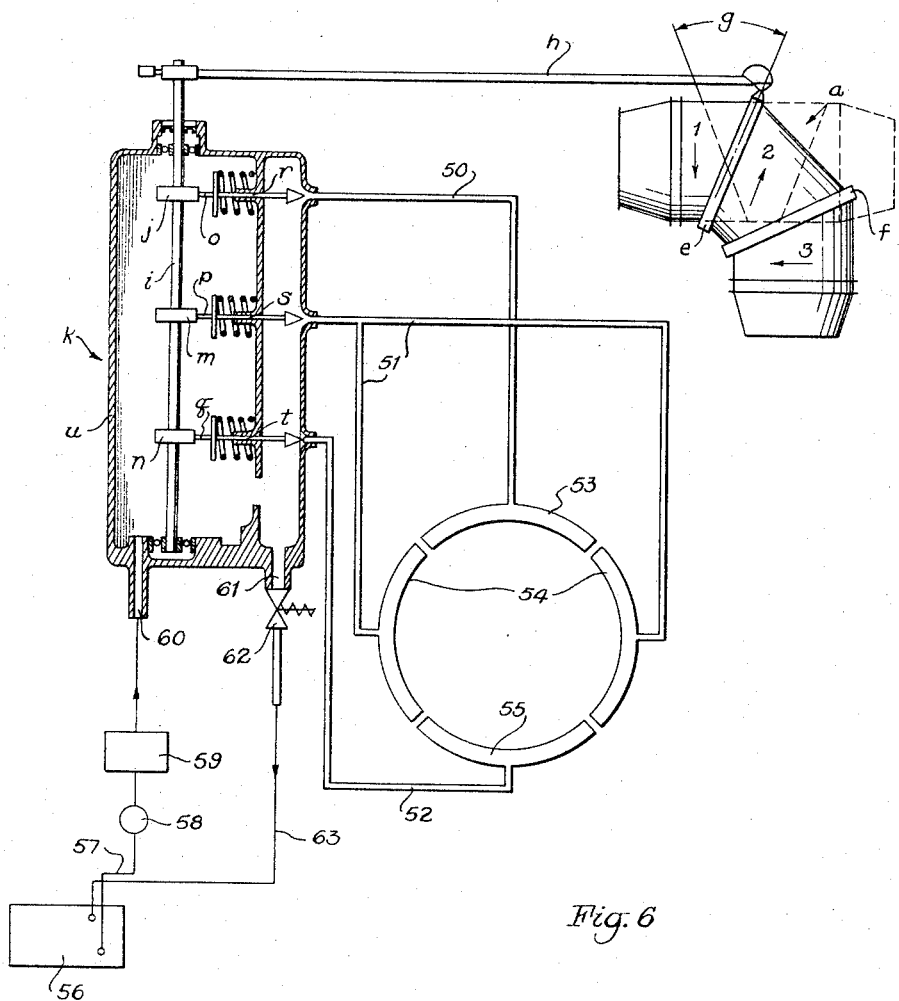
FIGURE 6 is a schematic view of a fuel control means.

FIGURE 6 is a schematic view of a fuel control means as applied, for example, to FIGURE 1. In order to turn the exhaust pipe from a straight to an elbow shape, the pipe sections 1, 2 and 3 are turned relative to one another on the joints $e$ and $f$ in the direction represented by the arrow $g$. A push rod $h$ engages the joint $e$ and transfers the turning movement onto the cam shaft $i$ of the fuel control apparatus $k$. The cams $l$, $m$ and $n$ on shaft $i$ actuate the stems $o$, $p$ and $q$ of the three springloaded throttle valves $r$, $s$ and $t$ contained in the apparatus $k$. Shaft $i$ and the associated valves are mounted within the housing $u$. The valves $r$, $s$ and $t$ are joined, respectively, through pipes 50, 51 and 52 to the fuel nozzle manifold segments 53, 54 and 55. Fuel is supplied to housing $u$ from a fuel tank 56, pipe 57, pump 58 and a controller 59 for the afterburner which can be set for the amount of fuel being supplied. From controller 59, the fuel flows through a port 60 in housing $u$ into the housing. A fuel return port 61 is connected to a throttle valve 62 and pipe 63 which extends to fuel tank 56. Excess fuel is thus recycled. The valve $r$ is shown open for the supply of fuel when the exhaust pipe has an elbow shape for vertical thrust. Fuel is thus supplied to manifold segment 53. The amount of fuel supplied to the nozzle segment 54 is less, as shown by the partial closing of valve $s$, and the supply of fuel to nozzle segment 55 is completely shut off as indicated by the valve $t$. By this arrangement, it is possible to distribute the amount of fuel to the fuel manifolds for each angle of the turning of the exhaust pipes so that a uniform temperature distribution is maintained in the exhaust pipe.

Moreover, the number of annular injection manifolds and their separation into individual injection manifold segments on combustion devices according to the invention may be chosen to suit practical requirements.

Having now described the means by which the objects of this invention are obtained, we claim:

1. An afterburner for the exhaust gas of a turbojet engine comprising a straight rigid exhaust pipe section (4), a plurality of movable exhaust pipe sections (1, 2 and 3) joined to each other and to said rigid section and being rotatable to change said pipe sections from a straight shape to a curved elbow shape for the discharge of the exhaust gas horizontally or vertically, and fuel nozzle means (5) stationarily mounted in said rigid exhaust pipe section for distributing fuel substantially uniformly across the exhaust pipe sections when in a straight shape and unevenly across the exhaust pipe sections when in the curved elbow shape for directing the gas flow centrally through the curved elbow shape to produce a uniform temperature distribution of the burning gases in the curved elbow shape and to keep the walls of the curved elbow shape at a relatively low temperature.

2. An afterburner as in claim 1, said fuel nozzle means comprising a plurality of circular fuel injection manifolds (16, 17, 19) concentrically positioned in said straight rigid exhaust pipe (4) and circular segment fuel injection manifolds (21, 22) concentric with said circular fuel injection manifolds, and separate fuel supply line means for said circular fuel injection manifolds and said circular segment fuel injection manifolds, respectively.

References Cited

UNITED STATES PATENTS

| | | | |
|---|---|---|---|
| 2,970,438 | 2/1961 | Howald | 60—39.74 |
| 3,020,717 | 2/1962 | Pearce | 60—39.28 |
| 3,074,668 | 1/1963 | Frenzl | 60—39.82 XR |
| 3,084,508 | 4/1963 | Olbrich | 60—232 |
| 3,149,463 | 9/1964 | Withers et al. | 60—39.74 XR |
| 3,327,480 | 6/1967 | Gunter | 60—232 |

JULIUS E. WEST, *Primary Examiner.*

U.S. Cl. X.R.

60—235, 237, 39.74